United States Patent
Fujita et al.

(10) Patent No.: US 6,590,844 B2
(45) Date of Patent: Jul. 8, 2003

(54) DISC-SHAPED RECORDING MEDIUM, DISC RECORDING AND/OR REPRODUCING METHOD AND APPARATUS AND TILT DETECTION METHOD

(75) Inventors: Goro Fujita, Kanagawa (JP); Masatoshi Kanno, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 09/883,526

(22) Filed: Jun. 18, 2001

(65) Prior Publication Data
US 2002/0021640 A1 Feb. 21, 2002

(30) Foreign Application Priority Data
Jun. 20, 2000 (JP) ...................... P2000-185068

(51) Int. Cl.[7] ................................. G11B 7/00
(52) U.S. Cl. ................ 369/53.19; 369/275.4; 369/44.32; 369/44.13
(58) Field of Search .............. 369/53.1, 53.11, 369/53.19, 53.2, 47.1, 59.1, 275.1, 275.4, 44.27, 44.28, 44.32, 44.13

(56) References Cited

U.S. PATENT DOCUMENTS 5,940,364 A * 8/1999 Ogata et al. .............. 369/275.4
6,327,240 B1 * 12/2001 Tobita et al. ............. 369/53.19

* cited by examiner

Primary Examiner—Muhammad Edun
(74) Attorney, Agent, or Firm—Jay H. Maioli (57) ABSTRACT

A recording and/or reproducing apparatus employing a disc-shaped recording medium in which difficulties in detecting an address in the case of a groove of the recording medium exhibiting superior recording characteristics and in detecting an address in the case that both a land and a groove of the recording medium are used as recording tracks are resolved. A recording and/or reproducing unit includes an optical head for illuminating the laser light converged as spots on an optical disc and for receiving the return light reflected and diffracted from the optical disc. An address information generating unit generates the address information from the return light received by the optical head in the recording and/or reproducing processing unit. A tilt compensation unit detects the inclination (tilt) of the optical head relative to the optical disc to correct the tilt of the optical head in accordance with the tilt detected.

25 Claims, 8 Drawing Sheets

DISC-SHAPED RECORDING MEDIUM, DISC RECORDING AND/OR REPRODUCING METHOD AND APPARATUS AND TILT DETECTION METHOD

BACKGROUND OF THE INVENTION

1. Field of the Invention

This invention relates to a disc-shaped recording medium and, more particularly, to a disc-shaped recording medium having a land and a groove formed alternately thereon. This invention also relates to a disc recording and/or reproducing method and apparatus for recording and/or reproducing data for the above disc-shaped recording medium and to a tilt detecting method for detecting tilt produced in recording and/or reproducing data on or from the disc-shaped recording medium.

2. Description of Related Art

An optical disc, such as a so-called CD (Compact Disc) or DVD (Digital Versatile Disc), is widely known as a recording medium having e.g., digital data optically recorded thereon.

An optical disc recording and/or reproducing apparatus for recording and/or reproducing digital data on or from the optical disc illuminates small-sized light spot, which is the converged laser light, on an optical disc run in rotation to record and/or reproduce the digital data. The optical head causes the laser light to follow a track formed on the optical disc surface in order to record digital data in stability on the optical disc or in order to reproduce digital data recorded on the optical disc.

Recently, such an optical disc has been devised in which, for raising the recording density of the optical disc, the land and the groove are alternately formed e.g., spirally to record data on the land and/or the groove.

As an example, there is known a system in which an address is afforded by a wobbled groove and is detected by a land as a recording track, as in MD-DATA2.

However, difficulties are met in address detection in case groove exhibiting superior recording characteristics is used as a recording track. Although a system is also envisaged in which both the land and the groove are designed to serve as recording tracks, difficulties are similarly met in such case in address detection.

Moreover, in the above-described optical disc, radial tilt tends to be produced due to warping of the disc caused by environmental factors, such as temperature or humidity, in use and/or on storage or as a result of handling states, or due to tilt of the optical head in an optical disc drive device. Since this tilt is responsible for aberration in the replay light spot, distortion in the playback signals, lowered MTF (modulation transfer function) or lowered recording power is produced in a known manner.

Recently, the tendency is towards increasing the numerical aperture (NA) of an objective lens in an optical head in an optical disc drive device for raising the recording density of the optical disc. For example, an objective lens with the value of NA of 0.45 and an objective lens with the value of NA of 0.60 are used for CD and DVD, respectively. As a result, the optical disc tends to be warped and, due the larger value of NA, the aberration angle dependency is also increasing.

On the other hand, in an optical disc driving device, such a system is in use in which a dedicated sensor is provided for detecting the tilt value for tilt compensation and in which an objective lens in an optical head or an actuator is inclined based on a detected signal.

However, if, in the conventional optical disc drive device, an optical disc is of a small diameter, there may not be provided a sufficient spacing in which to install a sensor used for detecting a tilt value to render the tilt value detection difficult.

SUMMARY OF THE INVENTION

It is therefore an object of the present invention to provide a disc-shaped recording medium in which addresses may be detected not only in case the land is used as a recording track but also in case the groove exhibiting higher recording properties is used as a recording track.

It is another object of the present invention to provide a disc recording and/or reproducing method and apparatus in which addresses may be detected not only in case the land is used as a recording track but also in case the groove exhibiting higher recording properties is used as a recording track.

It is yet another object of the present invention to provide a disc recording and/or reproducing apparatus and a tilt detecting method in which it is possible to detect tilt produced in a disc-shaped recording medium not only in case the land is used as a recording track but also in case the groove exhibiting higher recording properties is used as a recording track.

In one aspect, the present invention provides a disc-shaped recording medium in which a land and a groove are formed alternately and in which data is recorded on said land and/or said groove, wherein two of said grooves facing each other with a land in-between are wobbled based on respective different wobbling frequencies.

In another aspect, the present invention provides a recording and/or reproducing apparatus for a disc-shaped recording medium for recording and/or reproducing data on or from said disc-shaped recording medium having two sorts of wobbled grooves, each groove sort being of different wobbling frequencies, and lands, said grooves and lands being arranged alternately, said apparatus comprising optical head means for illuminating laser light, converged into spots, on said disc-shaped recording medium and for receiving return light reflected back and diffracted from said disc-shaped recording medium, and address information detection means for detecting the address information from the return light received by said optical head means.

In another aspect, the present invention provides a recording and/or reproducing method for recording and/or reproducing data on or from the disc-shaped recording medium having two sorts of wobbled grooves, each groove sort being of different wobbling frequencies, and lands, said grooves and lands being arranged alternately, said method comprising the steps of illuminating laser light on said disc-shaped recording medium and receiving the return light reflected back and diffracted from said disc-shaped recording medium, and detecting the address information from the received return light.

In another aspect, the present invention provides a recording and/or reproducing apparatus for a disc-shaped recording medium for recording and/or reproducing data on or from the disc-shaped recording medium having two sorts of wobbled grooves, each groove sort being of different wobbling frequencies, and lands, said grooves and lands being arranged alternately, said apparatus comprising optical head means for illuminating laser light, converged into spots, on said disc-shaped recording medium and for receiving return light reflected back and diffracted from said disc-shaped recording medium, amplitude information detection means for detecting an amplitude of a signal derived from the return light received by said optical head means, and tilt detection means for detecting a tilt value based on the signal amplitude detected by said amplitude information detection means.

In another aspect, the present invention provides A tilt detection method for detecting a tilt generated in recording and/or reproducing data on or from a disc-shaped recording medium having two sorts of wobbled grooves, each groove sort being of different wobbling frequencies, and lands, said grooves and lands being arranged alternately, said method comprising the steps of illuminating laser light, converged into spots, on said disc-shaped recording medium and for receiving the return light reflected back and diffracted from said disc-shaped recording medium, detecting an amplitude of a signal based of the received return light, and detecting a tilt value based on the detected signal amplitude.

According to the present invention, address detection becomes possible not only in case the land is used as a recording track but also in case the groove exhibiting more satisfactory recording characteristics. In addition, tilt detection becomes possible not only in case the land is used as a recording track but also in case the groove exhibiting more satisfactory recording characteristics.

DESCRIPTION OF THE PREFERRED EMBODIMENTS

Figure 1:
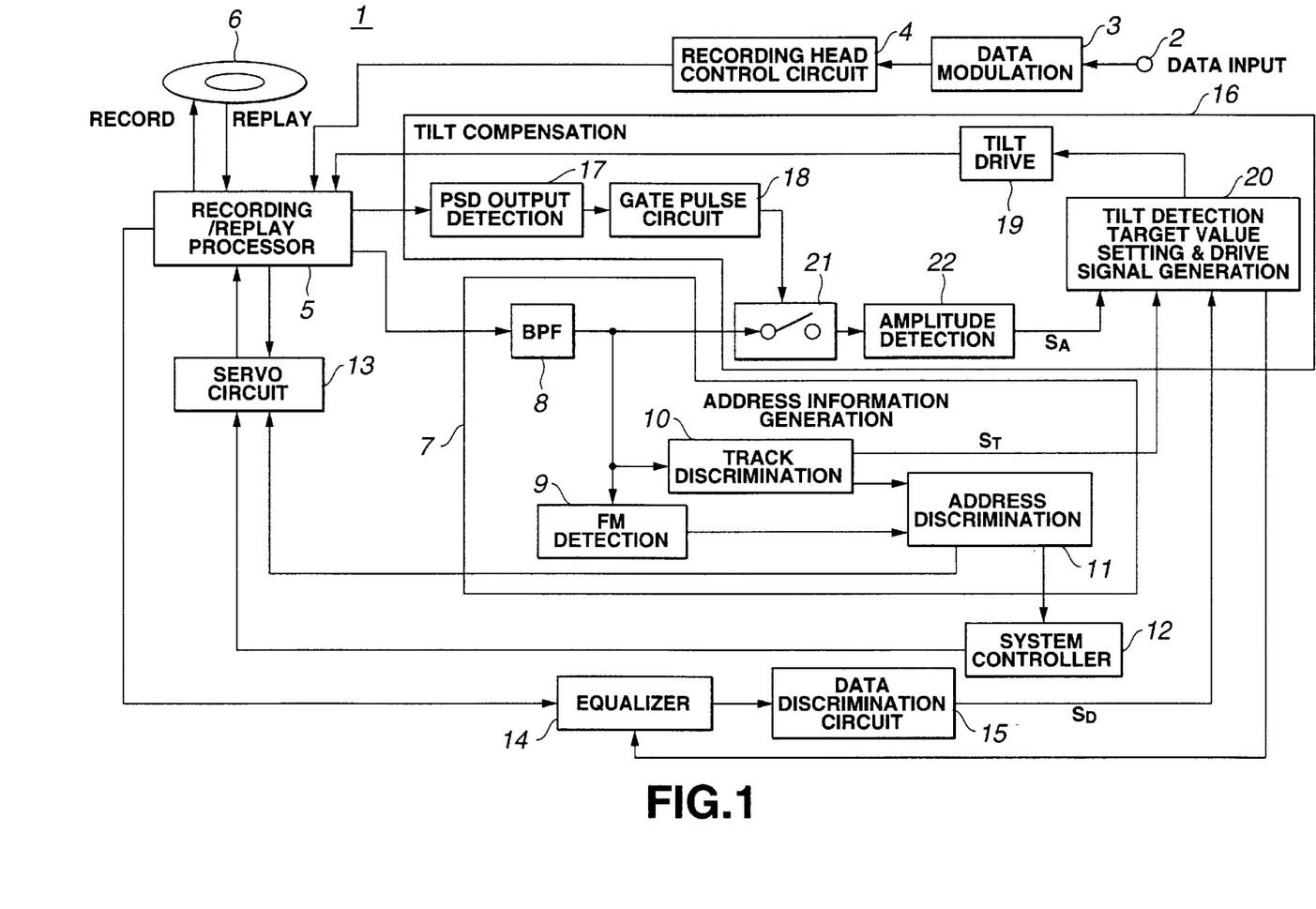
FIG. 1 is a block diagram showing a structure of an optical disc device embodying the present invention.

Referring to the drawings, a preferred embodiment of the present invention will be explained in detail. The present embodiment is directed to an optical disc device 1 for recording and/or reproducing data on or from an optical disc 6 having digital data recorded thereon, such as CD (Compact Disc), a DVD (Digital Versatile Disc) or MD (Mini Disc, trade name of a product of the present assignee). The optical disc device 1 includes a recording and/or reproducing processing unit 5 having optical head means for illuminating a light spot corresponding to converged laser light on the optical disc 6 and for receiving the return light reflected and diffracted by the optical disc 6, and an address information generating unit 7 for generating the address information from the return light from the optical head means provided in the recording and/or reproducing processor 5. The present optical disc device 1 also includes a tilt compensation unit 16 for detecting the tilt (inclination) of the optical head relative to the optical disc 6 for correcting the tilt of the optical head depending on the so-detected tilt. The optical disc device 1 will be explained in detail subsequently.

Figure 2:
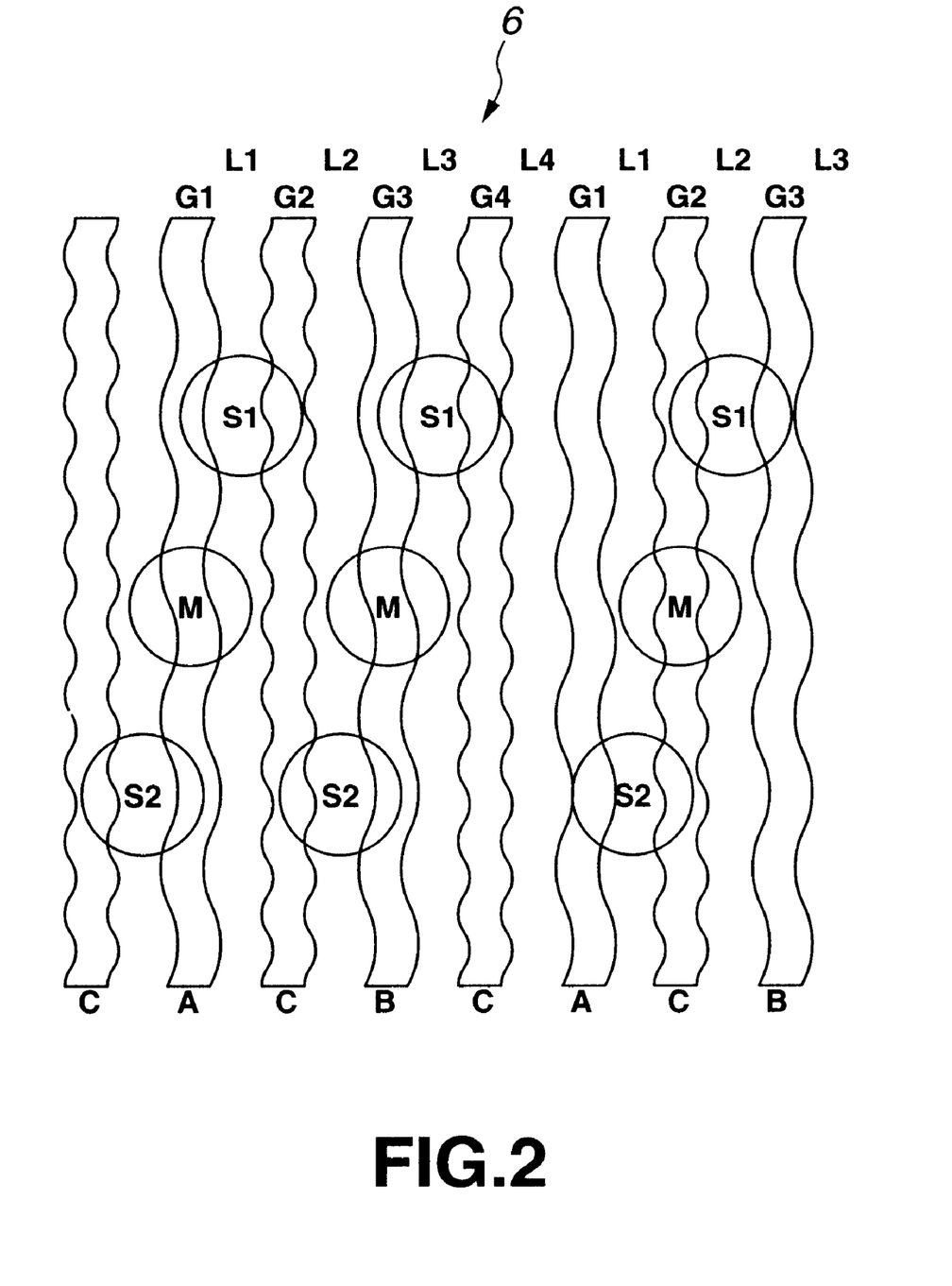
FIG. 2 shows a specified embodiment of an optical disc as a medium for recording and/or reproducing data in the optical disc device shown in FIG. 1.

Referring to FIG. 2, the optical disc 6 as a medium for recording and/or reproducing data in the optical disc device 1 is explained by referring to FIG. 2. The present optical disc 6 is a disc-shaped recording medium in which a land L and a groove G are formed alternately and in which data is recorded on the groove G. Two of the grooves on both sides of a land L serve as wobbling grooves the wobbling frequencies of which differ from each other. In the specified embodiment, shown in FIG. 2, address grooves G1, G3, frequency modulated about a frequency f as center based on the address information, and reference grooves G2, G4 modulated with a sole frequency f2, are arranged alternately, with the interposition of lands L1, L2, L3 and L4, as shown in FIG. 2. In this figure, the address groove G1 is a track A. an address groove G3 is a track B and each of the reference grooves G2, G4 is a track C.

The principle of the address discrimination processing and the tilt correction processing, executed by the optical disc device 1 on the above-described optical disc 6, is now explained. The detailed explanation will be given subsequently.

First, the optical head in the recording and/or reproducing processing unit 5 of the optical disc 1 illuminates, during replay, the main spot M on the land L and on the groove G on the optical disc 6, while illuminating the sub-spots S1, S2 arranged obliquely ahead and at back along the track direction oin both sides of the main spot M.

From the return beams of the sub-spots S1 and S2, and the main spot M, illuminated on the tracks A to C, the address information generating unit 7 of the optical disc device 1 extracts original wobble signals to generate an address. The original wobble signals, as detected from the return beams of the sub-spots S1 and S2, and the main spot M, illuminated on the tracks A to C, are shown in Table 1, in which components of the respective grooves are indicated as A, B and C.

TABLE 1

|  | S1 | M | S2 |
| --- | --- | --- | --- |
| G1 | A + C | A | A + C |
| G3 | B + C | B | B + C |
| G2 (G4) | B + C (A + C) | C | A + C (B + C) |

If low frequency components (Table 2) are separated by a filter from high frequency components (Table 3), an address signal is detected in the main spot M (Table 2) when the main spot M is in the address grooves G1 and G3 (tracks A and B), whilst signals of the grooves A and B are detected in the sub-spots S1 and S2 (Table 3) when the main spot M is in the reference grooves G2, G4 (track C), so that it can be discriminateed in which of the tracks G1 to G4 lies the main spot M.

TABLE 2

|  | S1 | M | S2 |
|---|---|---|---|
| G1 | A | A | A |
| G3 | B | B | B |
| G2 (G4) | B (A) | C | A (B) |

TABLE 3

|  | S1 | M | S2 |
|---|---|---|---|
| G1 | C |  | C |
| G3 | C |  | C |
| G2 (G4) | C | C | C |

From a difference of the amplitudes of detected signals of the return light of the sub-spots S1, S2, illuminated on the tracks A to C, the tilt compensation unit 16 of the optical disc device 1 detects and corrects the tilt of the optical head. That is, should the main spot M be on the address grooves (tracks A and B), the reference signals on the reference grooves are detected in the sub-spots. In the case that the amplitudes of these reference signals be equal to each other, the spots on the disc are symmetrical, with the tilt being zero. Similarly, should the main spot be on the reference groove, the signals of the grooves A and B are detected in the sub-spots, with the amplitude difference corresponding to the tilt error.

The optical disc 1 is now explained in detail. Input data at an input terminal 2 are converted by a data modulating unit 3 into pre-set codes for recording on the optical disc 6. These codes are output to a recording head control circuit 4.

The recording head control circuit 4 furnishes control signals to a recording and/or reproducing head, as later explained, of a recording and/or reproducing unit 5, to cause the codes furnished from the data modulating unit 3 to be recorded on the optical disc 6.

The recording and/or reproducing processing unit 5 operates under control by the recording head control circuit 4 to record data (codes) on the optical disc 6, to illuminate laser light on the optical disc 6, to receive the light reflected therefrom to read out the signal recorded thereon and to output RF signals and signals obtained on current to voltage (I–V) conversion to an equalizer 14 and to the address information generating unit 7, respectively. The recording and/or reproducing processing unit 5 also generates tracking error signals and focussing error signals from the reflected light as received to output the generated signals to a servo circuit 13. An objective lens of the optical head, making up the recording and/or reproducing processing unit 5, as later explained, is detected as to its position on a track on the optical disc 6.

The address information generating unit 7 extracts the wobbling signal from the I–V converted signal to verify from the wobbling signal whether the track currently recorded and/or reproduced is the address groove (tracks A, B) or the reference groove (track C). Based on the verified result (track discrimination signal ST), the address information generating unit 7 discriminates the address to output the discriminated address to a system controller 12. The address information generating unit 7 also extracts a carrier signal from the wobbling signal to output the extracted signal as the information on rotation to the servo circuit 13.

The system controller 12 outputs a pre-set control signal to the servo circuit 13 in accordance with an address furnished form the address information generating unit 7.

When fed with a signal corresponding to a pre-set operation from an input device, not shown, the system controller 12 furnishes a control signal corresponding to the operation to the servo circuit 13 to control the recording and/or reproducing processing unit 5.

The servo circuit 13 controls a driving unit of the recording and/or reproducing processing unit 5, responsive to the focussing error signals and the tracking error signals supplied from the recording and/or reproducing processing unit 5, to cause the movement of the optical head in its entirety and the objective lens of the optical head to adjust the focussing and tracking of the laser light utilized for data detection.

The servo circuit 13 also controls a spindle motor of the recording and/or reproducing processing unit 5, in accordance with the information on rotation from the address information generating unit 7, to cause the rotation of the optical disc 6 at a pre-set velocity, while controlling the recording and/or reproducing processing unit 5 responsive to a control signal from the system controller 12.

The equalizer 14 waveform-equalizes the RF signal, generated by the recording and/or reproducing processing unit 5 from the return light from the optical disc 6, to furnish the resulting signal to a data discriminating controlled 15, which then extracts data from a signal furnished from the equalizer 14 to verify the data detection capability to furnish a data discrimination signal SD to the tilt compensation unit 16.

The tilt compensation unit 16 detects the tilt value of the optical head and sets a target value used for compensating an indicated tilt value to compensate the tilt of the optical head based on a tilt error signal represented by the difference between the indicated tilt value and the target value. The tilt compensation unit 16 also sends the tilt error signal to the equalizer 14.

The recording and/or reproducing processing unit 5, address information generating unit 7 and the tilt compensation unit 16 are hereinafter explained in detail. First, the recording and/or reproducing processing unit 5 is explained with reference to FIG. 3. The recording and/or reproducing processing unit 5 includes a recording and/or reproducing head 25, a driving unit 26 and a signal processor 27. The recording and/or reproducing head 25 includes a magnetic head 33 and an optical head 34 and operates responsive to a control signal supplied from the recording head control circuit 4 to generate a magnetic field and the laser light from the magnetic head 3 and from an optical head 34, respectively, to record pre-set data on the optical disc 6. Meanwhile, the optical head 34 illuminates laser light on the optical disc 6 to receive the light reflected therefrom to output an electrical signal corresponding to the received light volume to the signal processor 27. On the optical head 34 is set a position sensing detector (PSD) 28 to detect the objective lens position with respect to the track on the optical disc 6.

Figure 3:
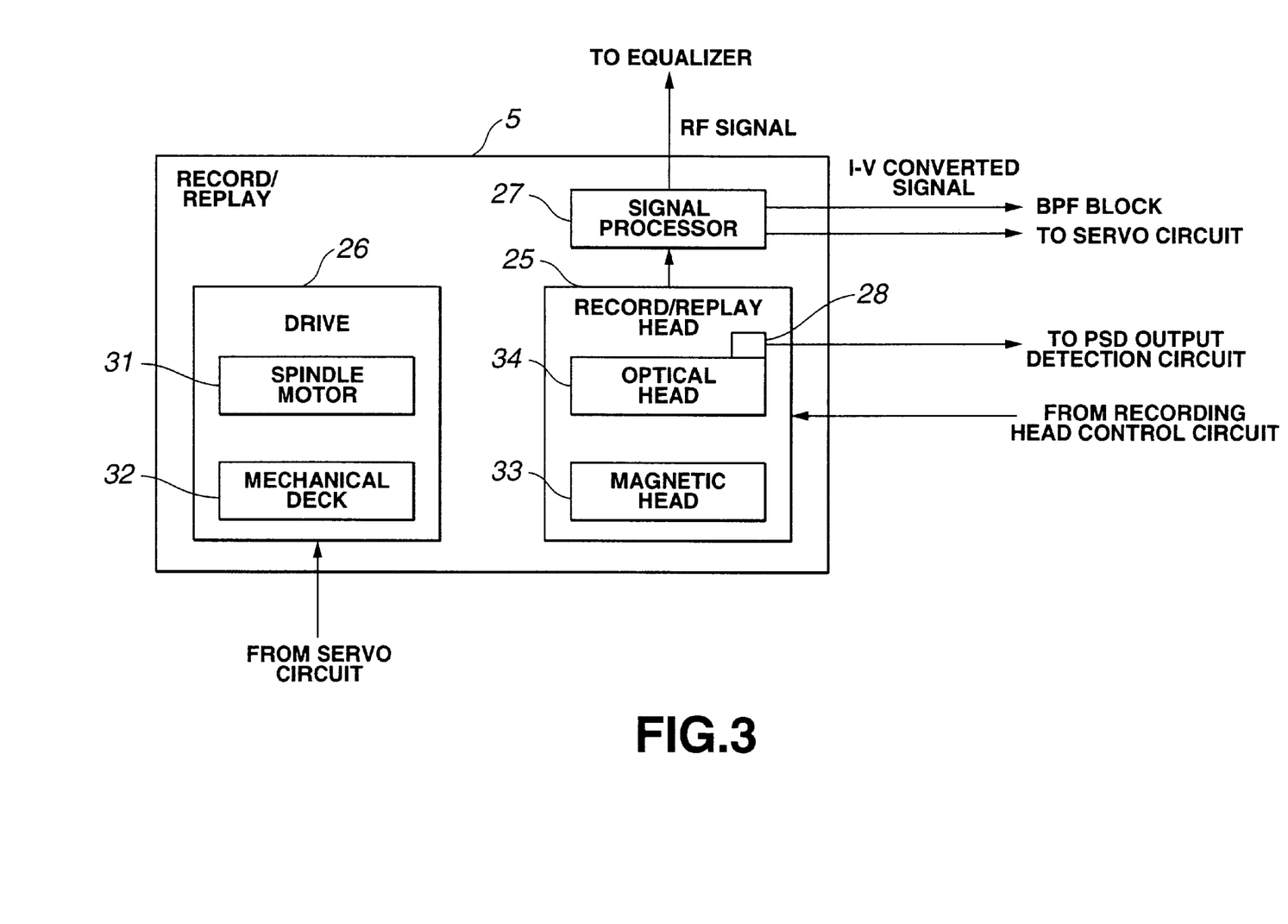
FIG. 3 is a block diagram showing a detailed structure of a recording and/or reproducing processor making up the optical disc device.
Figure 4:
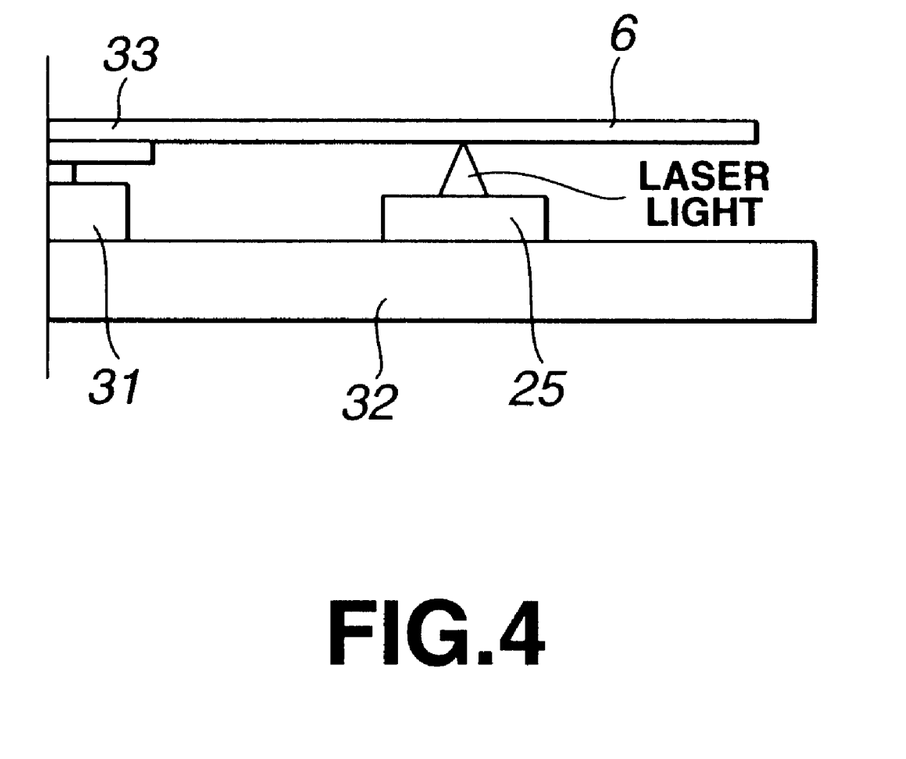
FIG. 4 shows an illustrative arrangement of a driving unit in the recording and/or reproducing processor shown in FIG. 3.

The driving unit 26 includes a spindle motor 31 for rotationally driving the optical disc 6, and a mechanical deck 32 for causing movement of the recording and/or reproducing head 25, and operates responsive to a control signal supplied from the servo circuit 13. FIG. 4 shows an illustrative structure of the driving unit 26. The spindle motor 31 is adapted for rotating the optical disc 6 secured to the turntable 33. The mechanical deck 32 is responsive to the control signal from the servo circuit 13 to cause movement of the recording and/or reproducing 25 along the radius of the optical disc 6.

The signal processor 27 converts read-out signals from the recording and/or reproducing head 25 with current to voltage (I–V) conversion to send the converted signal to the address information generating unit 7, while generating tracking error signals and focussing error signals to send the generated signals to the servo circuit 13. The signal processor 27 furnishes the as-converted RF signals to the equalizer 14.

Figure 5:
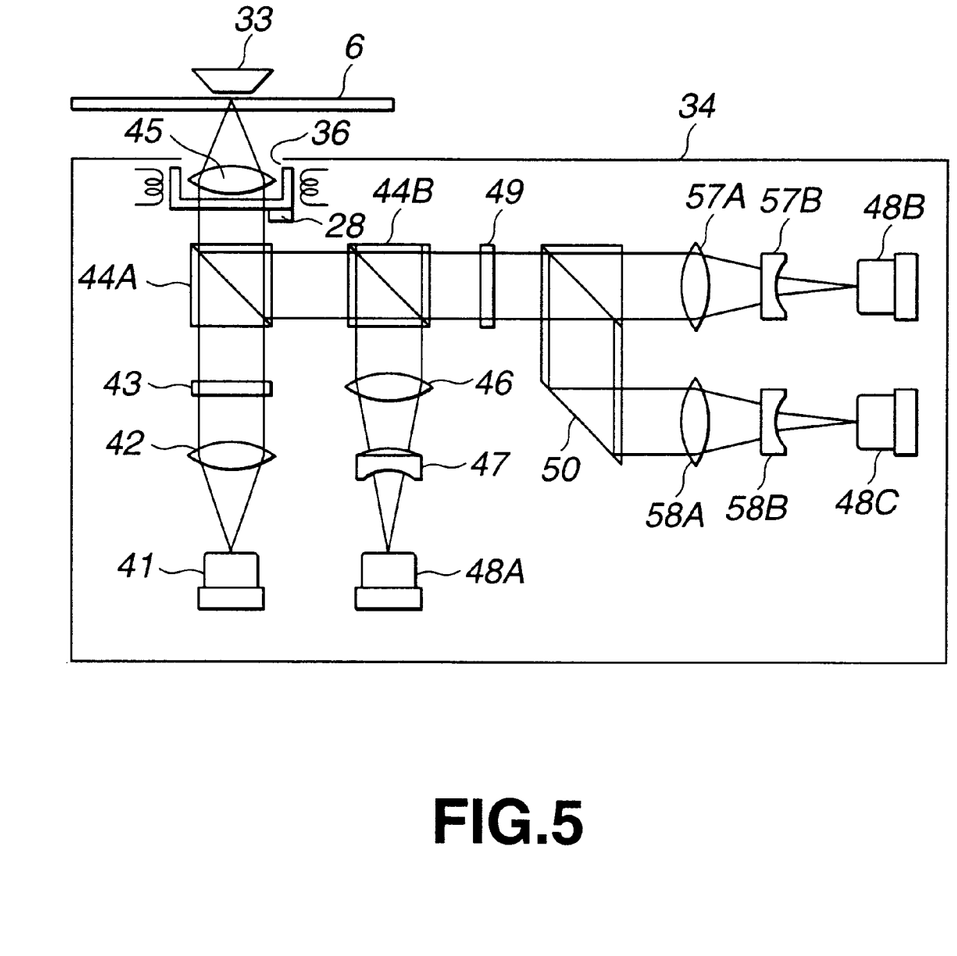
FIG. 5 shows an illustrative arrangement of a recording and/or reproducing hesd in the recording and/or reproducing processor shown in FIG. 3.

Referring to FIG. 5, showing an illustrative structure of the recording and/or reproducing head 25, a laser diode 41 illuminates the laser light of a pre-set wavelength to form a light spot in a pre-set area of a signal recording layer of the optical disc 6 through a collimator lens 42, a grating 43, a beam splitter 44A and an objective lens 45. The light reflected back from the optical disc 6 falls on the beam splitter 44A through the objective lens 45, so that part of the P-polarized component and the entire S-polarized component are extracted to fall on a beam splitter 44B. The beam splitter 44B causes part of the incident light beam to fall on a lens 46, while causing the remaining major portion of the light beam to fall on a polarizing beam splitter 50 through a half-wave plate 49. The polarizing beam splitter 50 separates the incident light beam into an S-polarized component and a P-polarized component which are incident on lenses 57A and 58A, respectively.

The light beam output from the beam splitter 44B to fall on the lens 46 falls on a photodiode 48A through a lens 47 which affords astigmatism to the laser light beam, so as to be thereby converted into electrical signals corresponding to the beam intensity, these electrical signals being output as servo signals (focussing error signals and tracking error signals) to the servo circuit 13. The light beam radiated from the polarizing beam splitter 50 falls on photodiodes 48B, 48C through lenses 57A, 57B, 58A and 58B. These photodiodes 48B, 48C convert the incident light beam into corresponding output electrical signals.

A magnetic head 33 is provided facing the objective lens 45, with the optical disc 6 in-between, and applies a magnetic field corresponding to the recording position to the optical disc 6.

In the present embodiment, the optical head 34 illuminates the main spot M and the sub-spots S1, S2, arranged obliquely ahead and at back on both sides of the main spot along the track direction. The objective lens 45 is driven at this time under an electromagnetic force produced by an actuator 36 and converges the laser light illuminated by the laser diode 41 for tracking at a desired position on the optical disc 6.

The position sensing detector 28 is annexed to the actuator 36 to detect the position of the objective lens 45 with respect to a track on the optical disc. The position sensing detector 28 outputs the detection signal to a PSD output detection circuit 17 of the tilt compensation unit 16, as later explained.

The address information generating unit 7 is now explained. The address information generating unit 7 includes a band-pass filter (BPF) block 8, an FM detection block 9, having plural FM detection circuits, a track discrimination circuit 10 for discriminating whether the wobbling component signal which has traversed the BPF block 8 is a return light from the address groove track or the return light from the reference groove track, and an address discrimination circuit 11 for discriminating an address from the signal which has passed through the BPF block 8 and the FM detection block 9. The BPF block 8 includes plural band-pass filters (BPFs) for passing a signal of a desired frequency component of the converted signal supplied from the recording and/or reproducing processing unit 5.

The BPF block 8 includes plural BPFs, as later explained, and interrupts RF signal components and other noise components, in order to take out wobbling component signals of the wobbling grooves comprised of the address grooves and the reference grooves, from among the converted signals supplied from the recording and/or reproducing processing unit 5, to permit passage of the signals of the desired frequency components. The wobbling component signals, passed through the BPF block 8, are sent to a switch 21 of the tilt compensation unit 16 and to the track discrimination circuit 10 and the FM detection block 9.

The FM detection block 9 is made up of three FM detection circuits, as later explained, and detects FM signals in order to detect FM signals to take out the frequency modulated address information from the return light of the main spot M and the two side spots S1, S2. The FM signals, detected by the FM detection block 9, are routed to the address discrimination circuit 11.

The track discrimination circuit 10 discriminates from which track the wobbling component signal passed through the BPF block 8, as return light beam, is derived, and furnishes a track discrimination signal ST, as a discrimination result, to a tilt detection target value setting and drive signal generating circuit 20, as later explained, of the tilt compensation unit 16, and to the address discrimination circuit 11.

The address discrimination circuit 11 discriminates an address, based on the FM signal supplied from the FM detection block 9 and the track discrimination signal ST, to route the result to the system controller 12.

Figure 6:
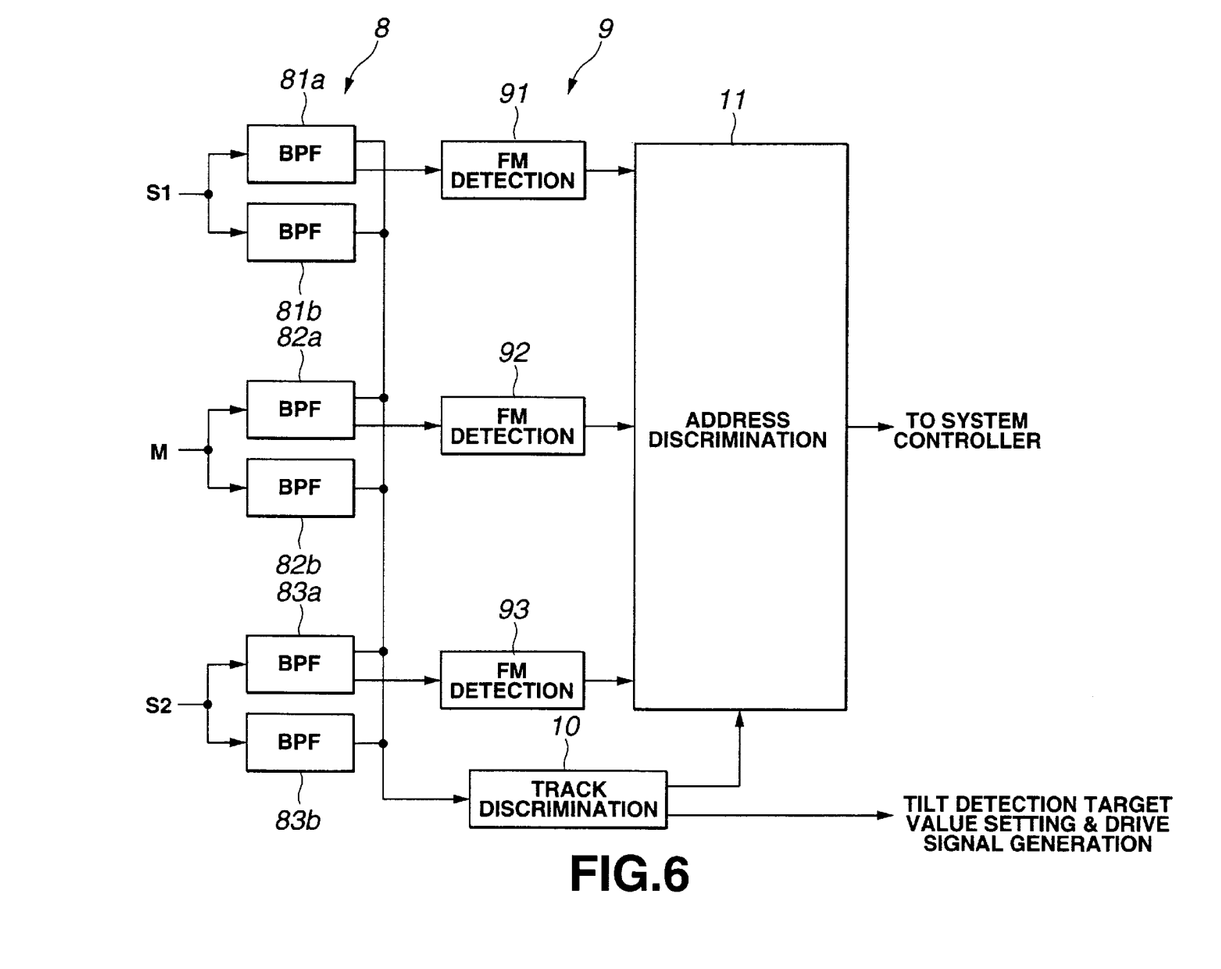
FIG. 6 is a block diagram showing the interconnection in an address information generator making up the optical disc device.

The structures of the BPF block 8 and the FM detection block 9 and the interconnection of these components, track discrimination circuit 10 and the address discrimination circuit 11 are hereinafter explained with reference to FIG. 6. The converted signal, generated by the signal processor 27 from the return light generated y the sub-spot S1, is routed to the BPFs 81a, 81b of the BPF block 8. Of these, the BPF 81a extracts wobbling component signals from the address grooves G1, G3 (tracks A and B), frequency modulated with the frequency f as center frequency, based on the address information. The BPF 81b extracts the wobbling component signals from the reference grooves G2, G4 (track C), modulated with the sole frequency 2f.

The converted signal generated from the return light derived from the main spot M is routed to BPFs 82a and 82b of the BPF block 8. Of these, the BPF 82a extracts the wobbling component signals from the address grooves G1, G3 (tracks A and B). On the other hand, the BPF 82b extracts the wobbling component signals from the reference grooves G2, G4 (track C).

The converted signal, generated from the return light, produced by the sub-spot S2, is routed to BPFs 83a and 83b of the BPF block 8. The BPF 83a extracts the wobbling component signals from the address grooves G1, G3 (tracks A and B), whilst the BPF 83b extracts the wobbling component signals from the reference grooves G2, G4 (track C).

The FM detection block 9 includes FM detection circuits 91 to 93. The FM detection circuit 91 detects the frequency modulated signals from the wobbling component signals from the address grooves G1, G3 (tracks A and B), generated by the BPF 81a based on the return light from the sub-spot S1, to route the detected signals to the address discrimination circuit 11. The FM detection circuit 92 detects the frequency modulated signals, from the wobbling component signals from the address grooves G1, G3 (tracks A and B), generated in the BPF 82a based on the return light of the main spot M, to route the detected signal to the address discrimination circuit 11. The FM detection circuit 93 detects the frequency modulated signals, from the wobbling component signals from the address grooves G1, G3 (tracks A and B), generated in the BPF 83a based on the return light of the main spot M, to route the detected signal to the address discrimination circuit 11.

The track discrimination circuit 10 receives the wobbling component signals from the BPFs 81a, 81b, 82a, 82b, 83a and 83b of the BPF block 8 to discriminate on which track lies the main spot M to route the track discrimination signal ST to the address discrimination circuit 11.

Based on the FM detection results from the FM detection circuits 91 to 93, and on the track discrimination signal ST, the address discrimination circuit 11 discriminates the address to route the result to the system controller 12.

Figure 7:
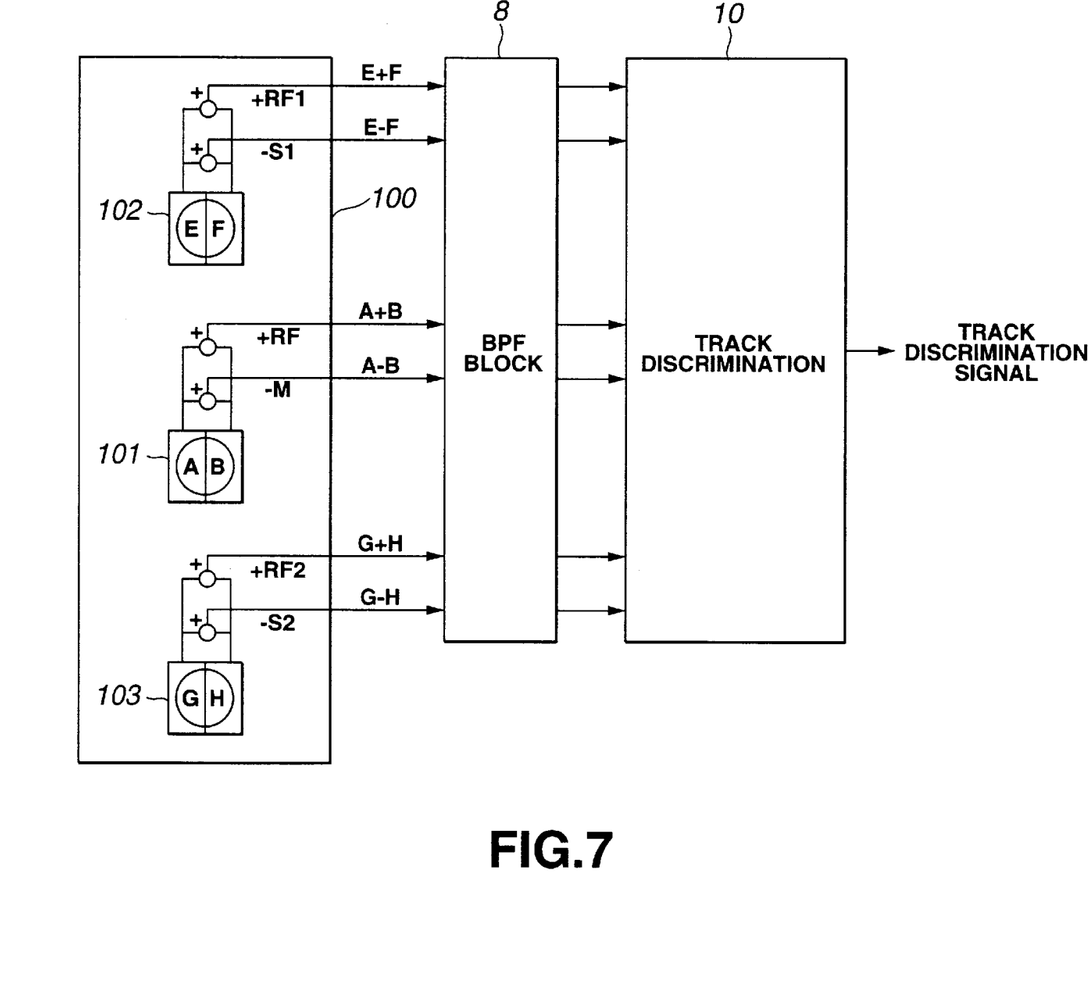
FIG. 7 schematically shows details of a photodiode light receiving unit receiving the return light beam of a main spot M and sub-spots S1 and S2 and the relation between a BPF block and a track discriminating circuit.

FIG. 7 schematically shows the state of a light receiving unit 100 of the photodiode 48A for receiving the return light beams of the main spot M and the sub-spots S1 and S2, and the relation between the BPF block 8 and the track discrimination circuit 10. The signals from respective light receiving sections 101 to 103 of the light receiving unit 100 are summed or subtracted by an operating unit and routed to the respective BPFs of the BPF block 8. The light receiving section 101 receives the return light of the main spot M to route A+B or A−B to the BPF block 8. The light receiving section 102 receives the return light of the sub-spot S1 to route E+F or E−F to the respective BPFs of the BPF block 8. The light receiving section 102 receives the return light of the sub-spot S2 to send G+H or G−H to the BPF block 8.

The tilt compensation unit 16 is now explained. The tilt compensation unit 16 includes a PSD output detection circuit 17 for detecting the position of an objective lens 45 relative to the track on the optical disc based on a detection signal of the position sensing detector 28 mounted on the optical head 34, and a gate pulse circuit 18 for generating gate pulses based on a detection signal of the PSD output detection circuit 17. The tilt compensation unit 16 also includes a switch 21 opened or closed based on the gate pulse generated by the gate pulse circuit 18 and an amplitude detection circuit 22 for detecting the amplitude of the respective wobbling component signals passed through the BPF block 8. The tilt compensation unit 16 also includes tilt detection target value setting and drive signal generating circuit 20 for driving the actuator 36 of the optical head 34 for tilt compensation.

Based on the detection signal, supplied from the position sensing detector 28, the PSD output detection circuit 17 detects the position of the objective lens 45 with respect to the track on the optical disc 6. The PSD output detection circuit 17 outputs a detection signal indicating the result of detection of the position of the objective lens 45 to the gate pulse circuit 18.

The gate pulse circuit 18 generates gate pulses, based on a detection signal from the PSD output detection circuit 17. Specifically, when the gate pulse circuit 18 has verified that the objective lens 45 has been positioned in the vicinity of the center of the track of the optical disc, based on the detection signal from the PSD output detection circuit 17, the gate pulse circuit 18 generates a gate pulse to close the downstream side switch 21. When the gate pulse circuit 18 has verified that the objective lens 45 is off the vicinity of the track on the optical disc 6, the gate pulse circuit 18 opens the downstream side switch 21.

The switch 21 is opened/closed, based on the gate pulse generated by the gate pulse circuit 18, to connect or interrupt the BPF block 8 with respect to the downstream side amplitude detection circuit 22.

The amplitude detection circuit 22 detects the amplitude of the respective wobbling component signals passed through the BPF block 8. The amplitude detection circuit 22 sends an amplitude detection signal SA, indicating the detected amplitude, to the downstream side tilt detection target value setting and drive signal generating circuit 20.

The tilt detection target value setting and drive signal generating circuit 20 detects the tilt value, based on the amplitude detection signal SA, supplied from the amplitude detection circuit 22, the track discrimination signal ST supplied from the track discrimination circuit 10 and on the data discrimination signal SD supplied from the data discrimination circuit 19. The tilt detection target value setting and drive signal generating circuit 20 also sets a target value for compensating the indicated tilt value indicating the detected tilt value. The tilt detection target value setting and drive signal generating circuit 20 also generates drive signals for driving the tilt driving circuit 19, as later explained, for compensating the tilt based on a tilt error signal represented by the difference between the indicated tilt value and the target value. The tilt detection target value setting and drive signal generating circuit 20 sends the detected tilt error signal to the equalizer 14, while sending the generated drive signal to the downstream side tilt driving circuit 19.

The tilt driving circuit 19 generates a control signal, based on a drive signal supplied from the tilt detection target value setting and drive signal generating circuit 20, to drive the actuator 36 of the optical head 34 in the direction of compensating the tilt.

The address discrimination processing performed by the optical disc device 1 on the optical disc 6 using the above-described address information generating unit 7 is explained. This address discrimination processing is such a processing in which the three spots illuminated on the track of the optical disc 6 from the optical head 34 of the recording and/or reproducing processing unit 5 are on-the-groove position, as shown in FIG. 2.

First, a specified embodiment in which the main spot M is in the on-track on the groove G1 as the track A is explained. The I–V converted signal, generated by the recording and/or reproducing processing unit 5 from the return light of the main spot M and the sub-spots S1, S2, is routed to the BPF block 8. The converted signal, derived from the return light of the main spot M, is routed to the BPFs 82a and 82b shown in FIG. 6. Since the main spot M is illuminated only on the track A as the address groove G1 frequency modulated about the frequency f based on the address information, only the original wobbling signal A shown in Table 1 is supplied to the BPFs 82a and 82b. The BPF 82a takes out only the track A as the low frequency component (frequency equal to f) from the original wobbled signal to route the signal to the track discrimination circuit 10 and to the FM detection circuit 92.

The converted signal, derived from the return light of the sub-spot S1, is supplied to the BPFs 81a, 81b. Since the sub-spot S1 is illuminated on the track A and to the reference groove G2 (track C) modulated with the sole frequency 2f, the BPFs 81a, 81b are fed with A and C, that is (A+C), as the original wobbling signal, as shown in the above Table 1. The BPF 81a takes out only A of the low frequency component from the original wobbling signal A+C, as shown in the above Table 2, to send it to the track discrimination circuit 10 and to the FM detection circuit 91. The BPF 81b takes out only the component C as the high frequency component (frequency equal to 2f) from the original wobbling signal A+C to send the component C to the track discrimination circuit 10.

The converted signal pertinent to the return light of the sub-spot S2 is sent to the BPFs 83a, 83b. Since the sub-spot S2 is also illuminated on the track A and on the reference groove (track C) modulated with the sole frequency 2f, the BPFs 83a, 83b are fed with A and C, that is (A+C), as the original wobbling signals, as shown in Table 1. The BPF 83a takes out only the low frequency component A from the original wobbling signal A+C, as shown in the above Table 2, to send the component A to the track discrimination circuit 10 and to the FM detection circuit 93. The BPF 83b takes out only the component C as the high frequency component (frequency equal to 2f) as shown in the above Table 3, to send the component C to the track discrimination circuit 10.

The track discrimination circuit 10 verifies that the level of the frequency f of the wobbling component signals contained in the return light of the main spot M is larger than the level of the frequency 2f and discriminates that the main spot M is on-the-groove state on the track A or B which is the address groove frequency modulated about the frequency f as center.

The FM detection circuit 91 FM-detects the low frequency component A passed through the BPF 81a to detect e.g., the bi-phase signal to send it to the address discrimination circuit 11. The FM detection circuit 92 FM-detects the low frequency component A passed through the BPF 82a to detect e.g., the bi-phase signal to send it to the address discrimination circuit 11. On the other hand, the FM detection circuit 93 FM-detects the low frequency component A passed through the BPF 83a to detect e.g., the bi-phase signal to send it to the address discrimination circuit 11.

Based on the result verified in the track discrimination circuit 10, that is the result that the main spot M is on-the-groove state on the track A or B; the address discrimination circuit 11 discriminates an address from the low frequency component A obtained by the BPF 82a from the return light of the main spot M.

A specified embodiment in which the main spot M is on-the-track state on the groove G3 as the track B is hereinafter explained. Since the main spot M is illuminated only on the track B as the address groove G3, as shown in Tables 1 to 3, only the original wobbling signal B is supplied to the BPFs 82a, 82b. The BPF 82a takes out only the original wobbling signal B to send it to the track discrimination circuit 10 and to the FM detection circuit 92.

Since the sub-spot S1 is also illuminated on the track B and on the reference groove C4 (track C), the BPFs 81a, 81b are fed with B and C, that is (B+C), as original wobbling signal, as shown in Table 1. The BPF 81a takes out only the low frequency component B from the original wobbling signal B+C to send it to the track discrimination circuit 10 and to the FM detection circuit 91. The BPF 82b takes out only C as the high frequency component (frequency equal to 2f) from the original wobbling signal B+C as shown in Table 3 to send it to the track discrimination circuit 10.

Since the sub-spot S2 is illuminated on the track B and on the reference groove C2 (track C), the BPFs 83a, 83b are fed with B and C, that is (B+C), as the original wobbling signal. The BPF 83a takes out only the low frequency component B from the original wobbling signal B+C, as shown in Table 2, to send the component B to the track discrimination circuit 10 and to the FM detection circuit 93. On the other hand, the BPF 83b takes out only the component C from the original wobbling signal B+C, as the high frequency component (frequency equal to 2f), as shown in Table 3, to send the component C to the track discrimination circuit 10.

The track discrimination circuit 10 then verifies that the frequency f level of the wobbling component signal contained in the return light of the main spot M is higher than the frequency 2f level and discriminates that the main spot M is in the on-the-groove state on the track A or B which is the address groove frequency modulated about the frequency f as center.

At this time, the FM detection circuit 91 FM detects the low frequency component B passed through the BPF 81a to detect a bi-phase signal which is sent to the address discrimination circuit 11. The FM detection circuit 92 FM detects the low frequency component B passed through the BPF 82a to detect a bi-phase signal which is sent to the address discrimination circuit 11, whilst the FM detection circuit 93 FM detects the low frequency component B passed through the BPF 83a to detect a bi-phase signal which is sent to the address discrimination circuit 11.

The address discrimination circuit 11 discriminates an address from the low frequency component B obtained by the BPF 82a from the return light of the main spot M, based on the verified result by the track discrimination circuit 10, specifically, the verified result that the main spot is in the on-the-groove state on the track A or B, to route the address to the system controller 12.

A specified embodiment in which the main spot M is in the on-the-track state on the groove G2 as the track C is explained. Since the main spot M is illuminated only on the track C as the address groove G2, only the original wobbling signal C is routed to the BPFs 82a and 82b. The BPF 82b takes out only the original wobbling signal C which is then routed to the track discrimination circuit 10.

Since the sub-spot S1 is illuminated on the tracks C and B, the BPFs 81a, 81b are fed with B and C, that is (B+C), as the original wobbling signal, as shown in Table 1. The BPF 81a takes out only the low frequency component B from the original wobbling signal B+C, as shown in Table 2, to route it to the track discrimination circuit 10 and to the FM detection circuit 91. The BPF 81b takes out only the component C as the high frequency component (frequence equal to 2f) as shown in Table 3 to route te component C to the track discrimination circuit 10.

Since the sub-spot S2 is illuminated on the tracks C and A, the BPFs 83a, 83b are fed with A and C, that is (A+C), as original wobbling signal, as shown in Table 1. The BPF 83a takes out only the low frequency component A from the original wobbling signal A+C, as shown in Table 2, to route the component A to the track discrimination circuit 10 and to the FM detection circuit 93, whilst the BPF 83b takes out only the component C from the original wobbling signal A+C, as the high frequency component (frequency equal to 2f) as shown in Table 3, to route the component C to the track discrimination circuit 10.

The track discrimination circuit 10 then verifies that the frequency level f of the wobbling component signal contained in the return light of the main spot M is smaller than the frequency level 2f and discriminates that the main spot M is in the on-the-groove state on the track C as the reference groove with the frequency equal to 2f.

At this time, the FM detection circuit 91 FM-detects the low frequency component B passed through the BPF 81a to detect a bi-phase signal which is sent to the address discrimination circuit 11. The FM detection circuit 92 FM-detects the low frequency component B passed through the BPF 82a to detect a bi-phase signal which is sent to the address discrimination circuit 11, whilst the FM detection circuit 93 FM detects the low frequency component B passed through the BPF 83a to detect a bi-phase signal which is sent to the address discrimination circuit 11.

The address discrimination circuit 11 discriminates an address from the low frequency components B and A obtained by the BPFs 81a and 83a from the return light of the sub-spots S1 and S2, based on the verified result by the track discrimination circuit 10, specifically, the verified result that the main spot is in the on-the-groove state on the track C, to route the address to the system controller 12.

The tilt compensation processing executed by the optical disc device 1 on the optical head 34 using the above-described tilt compensation unit 16 is hereinafter explained.

This may be clear when the three spots illuminated on the track of the optical disc 6 from the optical head 34 of the recording and/or reproducing processing unit 5 are in the state shown in FIG. 2.

When the main spot M is on the address groove G1 (track A), the reference grooves G2 (track C) and G4 (track C) are detected by the sub-spots S1 and S2, as shown in the Tables 1 to 3. Thus, it may be seen that, if the amplitudes thereof are equal to each other, the spots S1, S2 on the optical disc 6 are symmetrical, with the tilt then being zero. The same applies when the main spot M is on the address groove G3 (track B), such that it is sufficient if the tilt is compensated such as to render the spots S1 and S2 symmetrical on the optical disc 6.

If the main spot M is on the reference grooves G2, G4 (track C), the address grooves of the tracks A and B are detected by the sub-spots S1 and S2, so that the amplitude difference therebetween corresponds to the tilt error, it being sufficient to drive the objective lens 45 of the photographing 34 by the actuator 36 for compensation so that this tilt error will be equal to zero.

The operation of the optical disc device 1 is now explained. If, in recording data, a pre-set operation is executed by an input device, not shown, the system controller 12 sends a pre-set signal to the servo circuit 13, which is responsive to this signal to control the recording and/or reproducing processing unit 5 to start the rotation of the optical disc 6 and illumination of the laser light. The system controller 12 then proceeds to detection of the tracking error signals, focussing error signals and RF signals.

The tracking error signals and the focussing error signals, detected by the recording and/or reproducing processing unit 5, are output to the servo circuit 13, which then is responsive to these signals to send a pre-set control signal to the driving unit 26 to effect focussing servo and tracking servo processing.

On the other hand, the I–V conversion signals, obtained by the signal processor 27 of the recording and/or reproducing processing unit 5, are routed to the address information generating unit 7 where addresses are generated in accordance with the above-described principle and routed to these 13.

The system controller 12 actuates the driving unit 26 of the recording and/or reproducing processing unit 5, as it references the address, and commands the servo circuit 13 to cause the magnetic head 33 and the optical head 34 to be moved to a position of recording the data.

When the magnetic head 33 and the optical head 34 are moved to the data recording position, the system controller 12 commands the recording head control circuit 4 to record the data.

The recording head control circuit 4 controls the magnetic head 33 to record the data on the track of the optical disc 6, so that data may be recorded on the optical disc 6.

At this time, the tilt of the optical head 34 with respect to the optical disc 6 may be compensated by the tilt compensation unit 16.

Next, in reproduced the data, if a pre-set operation is performed in an input device, not shown, the system controller 12 is responsive to this operation to send a pre-set signal to the servo circuit 13. Responsive to this signal, the servo circuit 13 controls the recording and/or reproducing processing unit 5 to start the rotation of the optical disc 6 and illumination of the laser light and subsequently to detect focussing error signals, tracking error signals and RF signals.

The tracking error signals and the focussing error signals, detected by the recording and/or reproducing processing unit 5, are output to the servo circuit 13, which then is responsive to these signals to send a pre-set control signal to the driving unit 26 to effect tracking servo and focussing servo processing.

The IV conversion signal, obtained by the signal processor 27, is sent to the address information generating unit 7, where an address is generated in accordance with the principle as described above and is routed to the system controller 12.

The system controller 12 actuates the driving unit 26 of the recording and/or reproducing processing unit 5, as it references the address, and commands the servo circuit 13 to cause the magnetic head 33 and the optical head 34 to be moved to a position of reproducing the data.

The RF signals, detected by the recording and/or reproducing processing unit 5, as the magnetic head 33 and the optical head 34 are being moved under servo control to a position of reproducing the data, are waveform-equalized by the equalizer 14 and discriminated by the data discriminating controlled 15. The data may be reproduced in this manner from the optical disc 6.

At this time, the tilt of the optical head relative to the optical disc 6 is compensated by the tilt compensation unit 16.

As described above, the address may be generated from the optical disc 6, configured as shown in FIG. 2, as the track is discriminated, to record and/or reproduce data as the tilt is compensated.

Figure 8:
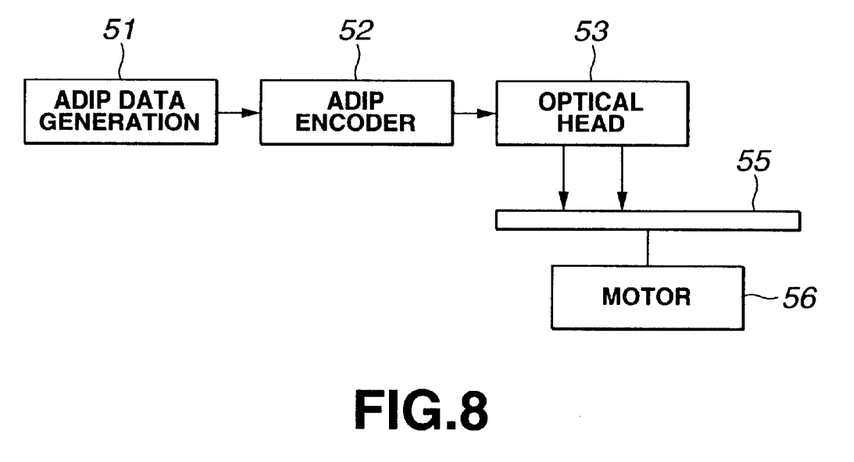
FIG. 8 is a block diagram showing a specified embodiment of an apparatus for recording the address information on an optical disc.

FIG. 8 shows a specified embodiment of an apparatus for recording the address information on the optical disc 6. An ADIP (address in pre-groove) data generating circuit 51 generates address data for the optical disc 6 (disc 55) to output the data to an ADIP encoder 52.

The ADIP encoder 52 bi-phase demodulates the supplied address data to frequency modulate the carrier signal of a pre-set frequency f with the modulated bi-phase signal to output the as-modulated signal (FM signal) to the optical head 53.

The optical head 53 illuminate the laser light on the disc 55 coated with a photoresistor as it is wobbled depending on the supplied modulated signal.

The disc 55 has its surface coated with a photoresist and is run in rotation at a pre-set speed by an electric motor 56. The surface of the disc 55 is sensitized to a wobbling shape corresponding to the address information by the laser light from the optical head 53 and is developed to form a wobbled address groove.

At this time, the optical head 53 generates another light beam to form a reference groove of the wobbling shape modulated with the sole frequency 2f simultaneously. The two beams are moved, in association with the rotation of the disc 55, so that a land will be generated between the trajectories of the two beams (address and reference grooves).

A stamper is prepared from this disc 55 and, from this stamper, a large number of optical discs 6 as replica discs are prepared. Meanwhile, the grooves are generated on light exposure, with the non-exposed portions proving the lands.

Figure 9:
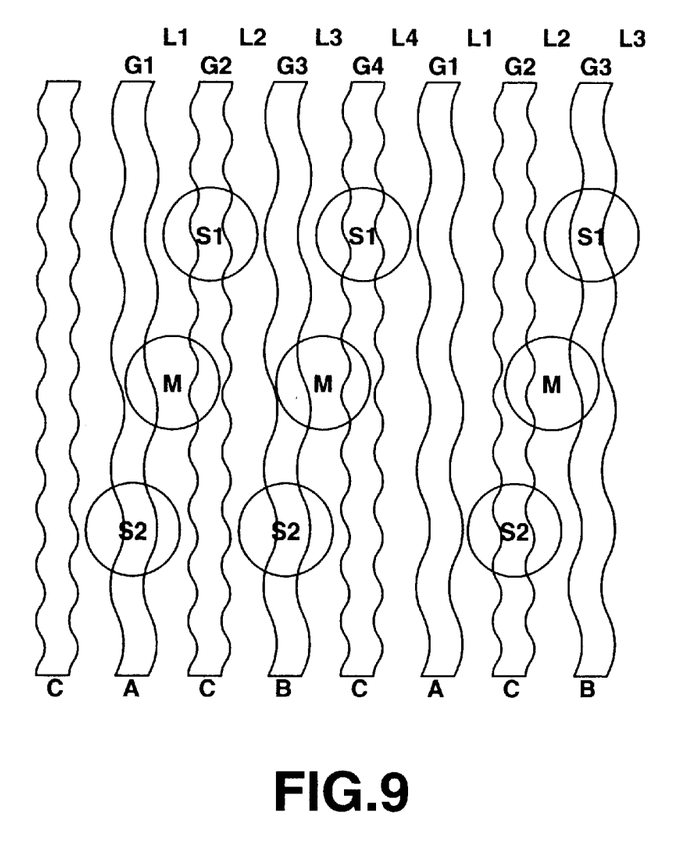
FIG. 9 shows another optical disc as a medium for recording and/or reproducing data in the optical disc device shown in FIG. 1.

As for the other disc which is to form a medium for recording and/or reproducing data in the optical disc device 1, it may be configured as shown in FIG. 9. In this optical disc, the lands L and the grooves G are formed alternately and data is recorded on the lands L. The two grooves facing each other with the land L in-between are wobbling grooves, these two wobbling grooves differing in the wobbling frequency. In the case of the optical disc of the land recording type, L1 to L4 track discrimination and tilt detection are possible from the detected results of the respective spots. In the above-described disc structure, it is possible to provide addresses as one or both of the lands and the grooves are used as recording tracks.

The MD-DATA2 corresponds to a combination in which the land serves as a recording track and the reference track remains unmodulated. So, the present invention encompasses an intermittent wobbling track configuration.

Although the foregoing embodiment is directed to an optical disc device for recording and/or reproducing data on or from an optical disc, the present invention is not limited to this type of the optical disc device 1. That is, the present invention may be applied to an optical disc reproducing apparatus for recording data on an optical disc or an optical disc reproducing apparatus for reproducing data from the optical disc.

What is claimed is:

1. A disc-shaped recording medium in which a plurality of lands and a plurality of grooves are formed alternately and in which data is recorded on said plurality of lands and/or said plurality of grooves, wherein
two of said plurality of grooves facing each other with a land in-between are wobbled based on respective different wobbling frequencies.

2. The disc-shaped recording medium according to claim 1 wherein
a wobbling frequency of a first groove of said two grooves is frequency modulated.

3. The disc-shaped recording medium according to claim 2 wherein
said wobbling frequency of said first groove indicates address information.

4. The disc-shaped recording medium according to claim 1 wherein
a wobbling frequency of a second groove of said two grooves is a unitary frequency.

5. The disc-shaped recording medium according to claim 1 wherein
a wobbling frequency of a first groove of said two grooves is phase modulated.

6. A recording and/or reproducing apparatus for a disc-shaped recording medium for recording and/or reproducing data on or from said disc-shaped recording medium having two types of wobbled grooves, each groove type having different wobbling frequencies, and lands, said grooves and lands being arranged alternately, said apparatus comprising:
optical head means for illuminating laser light, converged into spots, on said disc-shaped recording medium and for receiving return light reflected back and diffracted from said disc-shaped recording medium; and
address information detection means for detecting address information from said return light received by said optical head means.

7. The recording and/or reproducing apparatus for a disc-shaped recording medium according to claim 6 wherein
said optical head means illuminates a center spot and two side spots by said laser light on said disc-shaped recording medium.

8. The recording and/or reproducing apparatus for a disc-shaped recording medium according to claim 7 wherein, when said center spot is on one of said grooves, said optical head means arrays said two side spots on lands lying on both sides of said one groove so as to affect grooves lying on both sides of said lands lying on both sides of said one groove.

9. The recording and/or reproducing apparatus for a disc-shaped recording medium according to claim 8 wherein
said address information detection means detects track information from signals of each groove obtained from each of said three spots illuminated by said optical head means on said disc-shaped recording medium.

10. A recording and/or reproducing method for recording and/or reproducing data on or from a disc-shaped recording medium having two types of wobbled grooves, each groove type having different wobbling frequencies, and lands, said grooves and lands being arranged alternately, said method comprising the steps of:
illuminating laser light on said disc-shaped recording medium and receiving return light reflected back and diffracted from said disc-shaped recording medium; and
detecting address information from said received return light.

11. The recording and/or reproducing method for a disc-shaped recording medium according to claim 10 wherein
a center spot and two side spots are illuminated by said laser light on said disc-shaped recording medium.

12. The recording and/or reproducing method for a disc-shaped recording medium according to claim 11 wherein, when said center spot is on one groove, said two side spots are arranged on lands lying on both sides of said one groove so as to affect grooves lying on both sides of said lands lying on both sides of said one groove.

13. The recording and/or reproducing method for a disc-shaped recording medium according to claim 12 further comprising the step of detecting track information from signals of each groove obtained from each of said three spots illuminated on said disc-shaped recording medium.

14. A recording and/or reproducing apparatus for a disc-shaped recording medium for recording and/or reproducing data on or from said disc-shaped recording medium having two types of wobbled grooves, each groove type having different wobbling frequencies, and lands, said grooves and lands being arranged alternately, said apparatus comprising:
optical head means for illuminating laser light, converged into spots, on said disc-shaped recording medium and for receiving return light reflected back and diffracted from said disc-shaped recording medium;
amplitude information detection means for detecting an amplitude of a signal derived from said return light received by said optical head means; and
tilt detection means for detecting a tilt value based on said signal amplitude detected by said amplitude information detection means.

15. The recording and/or reproducing apparatus for a disc-shaped recording medium according to claim 14 wherein said optical head means illuminates a center spot and two side spots by said laser light on said disc-shaped recording medium.

16. The recording and/or reproducing apparatus for a disc-shaped recording medium according to claim 15 wherein, when said center spot is on one groove, said optical head means arrays said two side spots on lands lying on both sides of said one groove so as to affect grooves lying on both sides of said lands lying on both sides of said one groove.

17. The recording and/or reproducing apparatus for a disc-shaped recording medium according to claim 14 wherein said tilt detection means sets a target value for compensating a tilt indicating value indicating said tilt value.

18. The recording and/or reproducing apparatus for a disc-shaped recording medium according to claim 14 wherein said tilt detection means generates a drive signal for compensating a tilt based on a tilt error signal represented by a difference between said tilt value and a target value for compensating said tilt value.

19. The recording and/or reproducing apparatus for a disc-shaped recording medium according to claim 14 further comprising filter means corresponding to respective wobbling frequencies of said two groove types, wherein
said amplitude detection means detects an amplitude of respective wobbling component signals input thereto by signals from said optical head means passing through said filter means;
said tilt detection means drives said optical head means so that said amplitude of said respective wobbling component signals will be equal to each other.

20. A tilt detection method for detecting a tilt generated in recording and/or reproducing data on or from a disc-shaped recording medium having two types of wobbled grooves, each groove type having different wobbling frequencies, and lands, said grooves and lands being arranged alternately, said method comprising the steps of:

illuminating laser light, converged into spots, on said disc-shaped recording medium and receiving return light reflected back and diffracted from said disc-shaped recording medium;

detecting an amplitude of a signal based of said received return light; and detecting a tilt value based on said detected signal amplitude.

21. The tilt detection method for a disc-shaped recording medium according to claim 20 wherein a center spot and two side spots are illuminated by said laser light on said disc-shaped recording medium.

22. The tilt detection method for a disc-shaped recording medium according to claim 21 wherein, when said center spot is on one groove, said two side spots are arrayed on lands lying on both sides of said one groove so as to affect grooves lying on both sides of said lands lying on both sides of said one groove.

23. The tilt detection method for a disc-shaped recording medium according to claim 20 wherein a target value is set for compensating a tilt indicating value indicating said tilt value.

24. The tilt detection method for a disc-shaped recording medium according to claim 20 wherein a drive signal for compensating a tilt is generated based on a tilt error signal represented by a difference between said tilt value and a target value for compensating said tilt value.

25. The tilt detection method for a disc-shaped recording medium according to claim 20 wherein said amplitude detecting step detects an amplitude of each wobbling component signal associated with each wobbling frequency from a signal derived from said received return light; and wherein said tilt value detecting step includes a step of driving an objective lens so that said amplitude of each respective wobbling component signal will be equal.

* * * * *